July 21, 1964
D. M. DART
3,141,308
EVAPORATIVE COOLING APPARATUS FOR A REFRIGERANT
Filed July 1, 1963
3 Sheets-Sheet 1
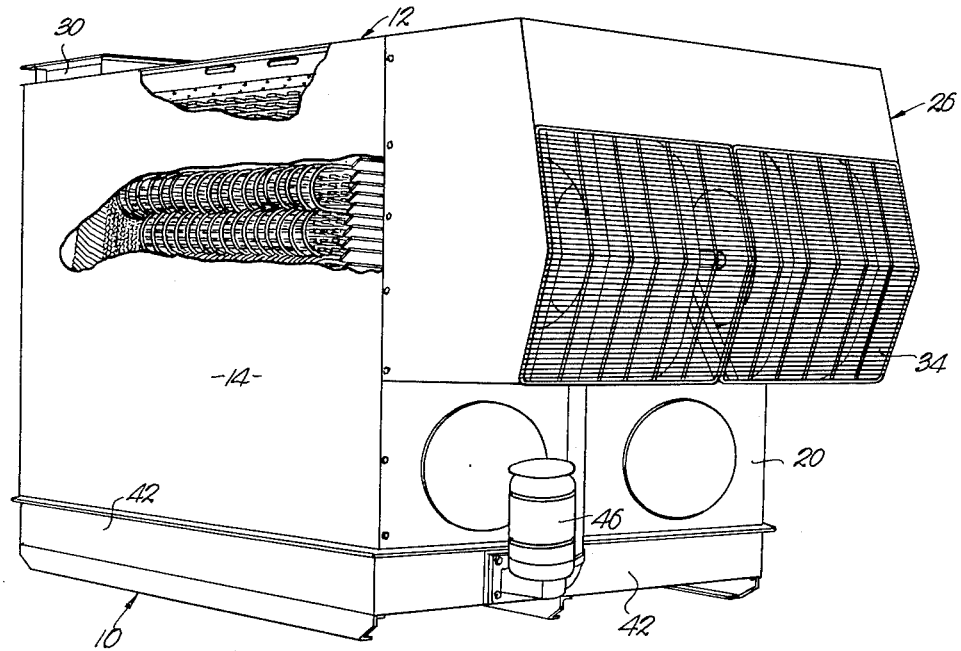
Fig. 1.
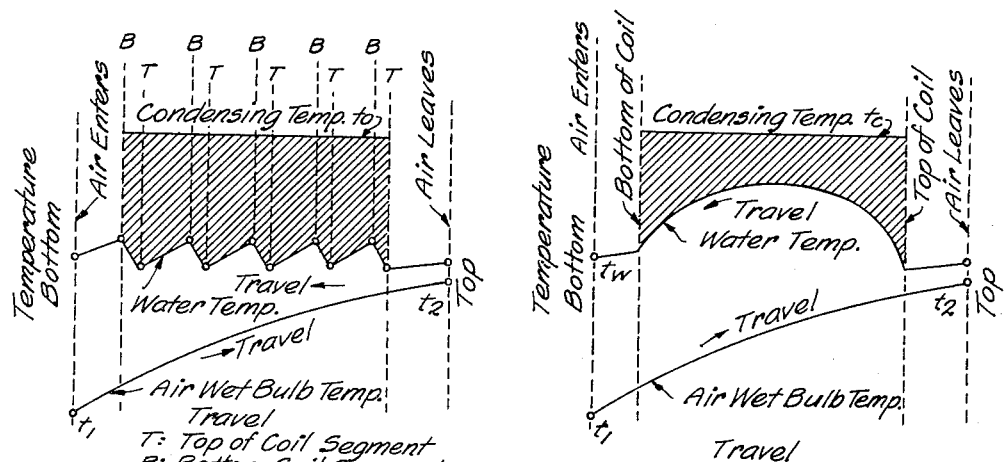
Fig. 7.
Fig. 8.
INVENTOR.
David M. Dart
BY
ATTORNEYS.

July 21, 1964　　　　　D. M. DART　　　　　3,141,308
EVAPORATIVE COOLING APPARATUS FOR A REFRIGERANT
Filed July 1, 1963　　　　　　　　　　　　　3 Sheets-Sheet 2
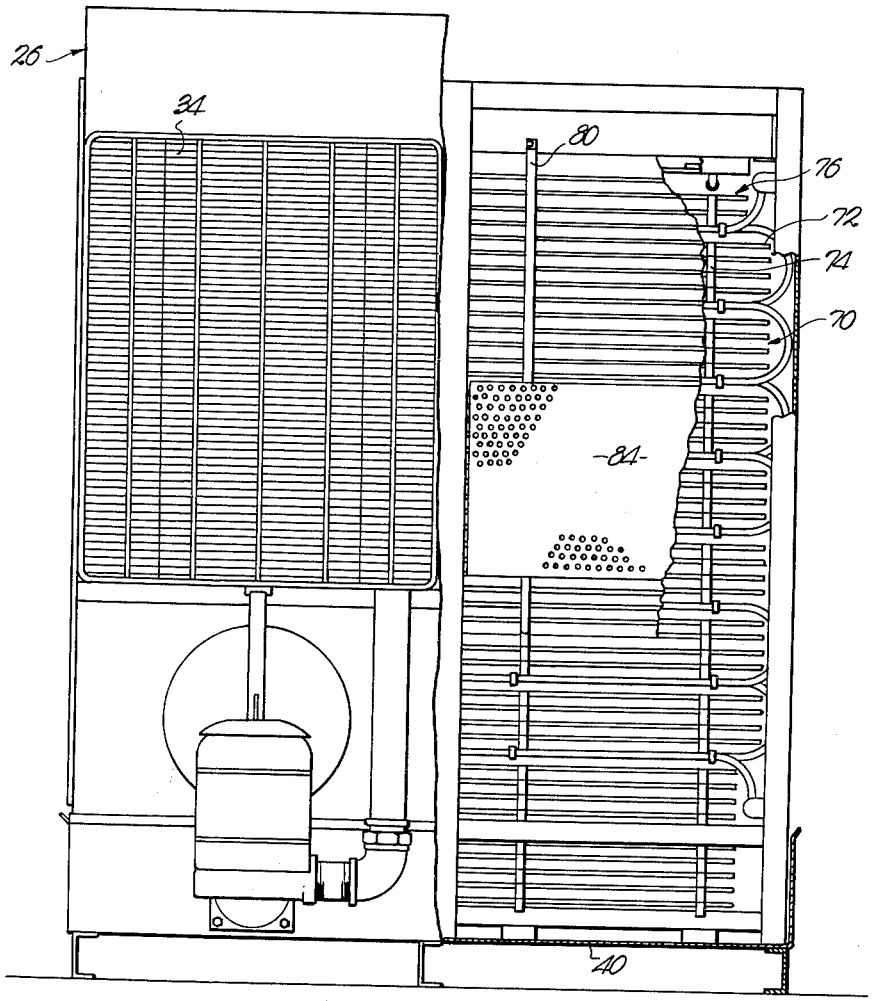
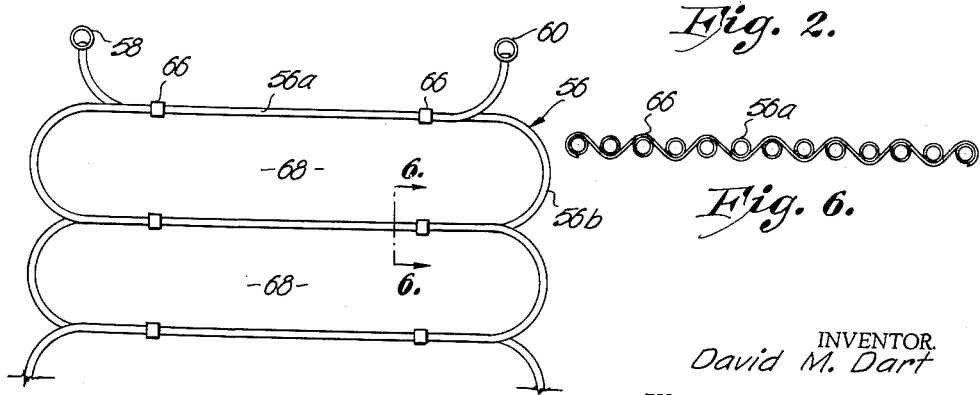
INVENTOR.
David M. Dart
BY
Hovey, Schmidt, Johnson & Hovey
ATTORNEYS.

July 21, 1964  D. M. DART  3,141,308
EVAPORATIVE COOLING APPARATUS FOR A REFRIGERANT
Filed July 1, 1963  3 Sheets-Sheet 3

INVENTOR.
David M. Dart
BY
Hovey, Schmidt, Johnson & Hovey

United States Patent Office 3,141,308
Patented July 21, 1964

3,141,308
EVAPORATIVE COOLING APPARATUS FOR
A REFRIGERANT
David M. Dart, Shawnee Mission, Kans., assignor to The
Marley Company, Kansas City, Mo., a corporation of
Delaware
Filed July 1, 1963, Ser. No. 291,951
12 Claims. (Cl. 62—305)

This invention relates to cooling equipment for use with refrigeration apparatus and particularly to evaporative condensers wherein the refrigerant vapor to be condensed is passed through a coil flooded with water to effect condensation thereof more rapidly than is obtained by passage of air alone over the condenser coils.

Various types of evaporative condensers have previously been employed to condense fluid such as refrigerant vapors, with smaller volumes of air and less condensing tube surface areas being required than with air cooled condensers, but evaporative cooling apparatus has not heretofore been fully successful because of rapid heating of the water as the same flows over the condenser coils, thereby materially decreasing the rate of thermal transfer and necessitating the utilization of substantially larger coil surface area than is desired and bringing the size of the condensers to substantially that of air cooled condensers.

It is therefore the primary object of the present invention to provide evaporative cooling apparatus for condensing refrigerant vapors and the like, wherein maximum thermal exchange efficiency is obtained by maintaining the temperature difference between the water and the refrigerant vapor at a maximum during the heat transfer process and with a minimum volume of air and coil surface area being needed to effect complete conversion of the refrigerant vapor to a liquid.

Also an important object of the invention is to provide highly efficient evaporative cooling apparatus as referred to above, wherein the difference in temperature between the vapor and the water is maintained at a maximum throughout the condensing process by the expedient of an intermingling fill assembly structure with the condenser coils to break the water passing through the apparatus into small droples, thereby increasing the surface area of the water exposed to currents of air directed through the condensing unit and preventing heating of the water to a temperature approaching that of the vapor, at all points throughout the vertical height of the condensing apparatus.

Thus, another very important object of the present invention is to provide evaporative cooling apparatus having reduced condenser tubing area as compared with prior units of the same rating, whereby the apparatus may be manufactured in more compact form and reducing the quantity of material necessary to construct the unit as well as fabrication time thereof.

A still further important object of the invention is to provide evaporative cooling apparatus wherein the condenser tubes comprise a series of individual, elongated, longitudinally serpentine, upright conduits connected to the refrigerant supply and return structure in parallel relationship thereto, and with the main horizontal sections of the individual conduits providing support surfaces for the fill assemblies mounted between adjacent horizontal sections of the condenser conduits, thereby decreasing the structural framework required internally of the apparatus, permitting ready removal of the fill assemblies for cleaning of the condenser tubes as needed, and permitting construction of a very compact unit for use in crowded spaces, either external to or within the building to be cooled by the refrigeration equipment.

It is another important aim of the invention to provide evaporative cooling apparatus wherein the condenser coils are flooded with extremely heavy water loading at each stage so that more efficient condensation of the refrigerant vapor is obtained by virtue of the fact that the individual sections of the coil conduits are surrounded by a layer of water of considerable depth rather than just a thin spray. In this manner, all of the evaporative water cooling takes place between the horizontal sections of the refrigerant conduit, rather than on the coil surfaces and precluding build-up of mineral deposits on the conduit surfaces requiring frequent cleaning thereof.

It is another important object of the invention to provide evaporative cooling apparatus as described wherein efficient inlet louver and drift eliminator structures are provided in operable association with the condenser coils and the fill assemblies for preventing splash-out of water from the casing of the apparatus, even during periods when the fan means is operating at maximum speed, thereby permitting installation of the apparatus inside or outside of a building as required for a particular application and to meet space requirements.

Other important objects and details of the present apparatus will be described or become obvious as the following specification progresses.

In the drawings:

FIGURE 1 is a front perspective view of evaporative cooling apparatus constructed in accordance with the preferred concepts of the present invention, with a portion of the casing of the apparatus being broken away to reveal the internal structure of the apparatus;

FIG. 2 is a front elevational view of the apparatus, with one portion of the front of the casing and associated fan means being removed to more clearly illustrate the structure therebehind;

FIG. 5 is an enlarged, fragmentary, side elevational view of the condenser unit forming a part of the evaporative cooling apparatus, and illustrating the generally serpentine configuration of the refrigerant conduits;

FIG. 6 is an enlarged, vertical cross-sectional view taken on the line 6—6 of FIG. 5 and also looking in the direction of the arrows;

Figure 3:
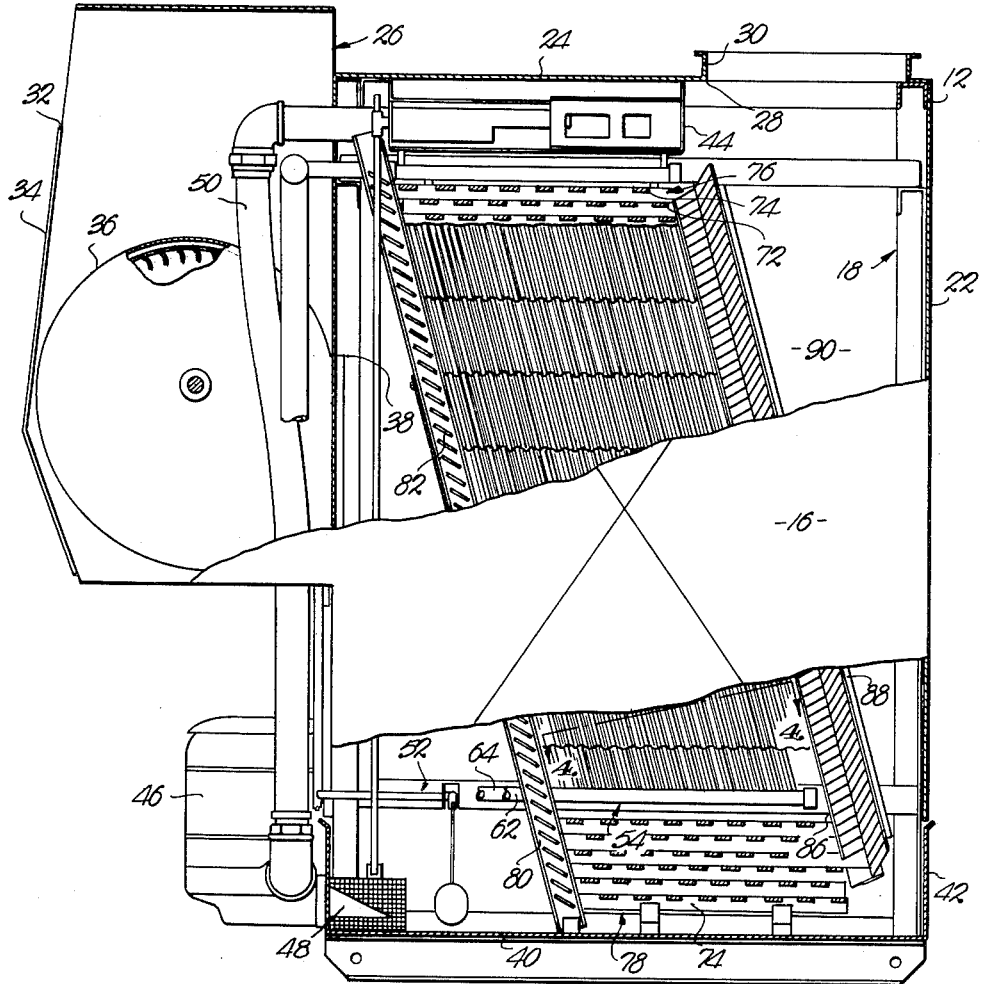
FIG. 3 is a side elevational view of the apparatus, with a major portion of the adjacent side wall of the casing being broken away to reveal the construction of the components located internally of the casing.
Figure 4:
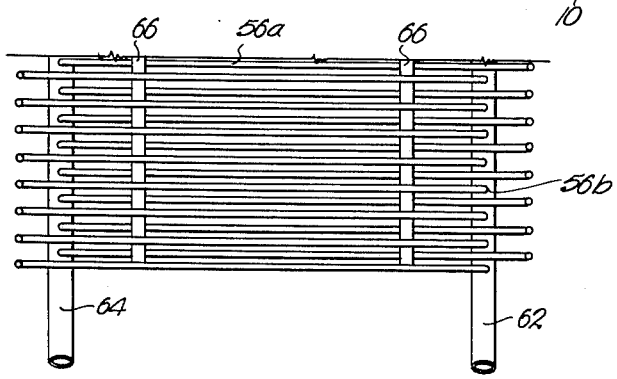
FIG. 4 is a cross-sectional view taken substantially on the line 4—4 of FIG. 3 and looking downwardly in the direction of the arrows.

FIG. 7 is a diagrammatic representation of the water temperature plotted as the latter falls through the condenser units of the present invention wherein the horizontal segments thereof are separated by fill assembly structures positioned in accordance with the concepts of the invention; and FIG. 8 is a schematic showing of the temperature of water as the same is passed over a single coil evaporative condenser of heretofore conventional construction.

Evaporative cooling apparatus 10 includes an outer casing 12 of galvanized sheet metal or the like and provided with a pair of upright side walls 14 and 16 secured to a generally rectangular internal support frame 18, and a substantially narrower front wall 20 spanning the distance between walls 14 and 16. The rectangular rear wall 22 closes the backside of casing 12, while the top wall 24 extending rearwardly from the fan housing 26 above front wall 20 and projecting forwardly therefrom, terminates in spaced relationship from rear wall 22 to define an air outlet 28. The rectangular flange member 30 secured to the framework 18 within air outlet 28 may be connected to suitable duct work if desired when apparatus 10 is mounted within an enclosure such as a building.

Fan housing 26, which has an air inlet 32 in the forward face thereof, normally covered with a protective grill 34, mounts a pair of centrifugal blowers adapted to force air into the interior of casing 12 for flow therethrough prior to discharge via air outlet 28. The enclosure 36 of one of the blowers is illustrated in FIG. 3, wherein it can be seen that the outlet 38 thereof extends directly into and communicates with the interior of casing 12 above front wall 20.

The rectangular bottom wall 40 of casing 12, cooperates with the upstanding, relatively narrow plates 42 on each margin of bottom wall 40, to define an open type water catch basin spanning the full width and length of casing 12. A water distribution tray 44 (FIG. 3) carried by frame 18 in direct underlying relationship to top wall 24 between fan housing 26 and air outlet 28, substantially spans the distance between side walls 14 and 16, and has a series of equally spaced openings therein for permitting water directed into tray 44 to gravitate therefrom simultaneously through all of the distribution ports. Pump 46 mounted on the front plate 42 of the catch basin, communicates with the latter through the water inlet structure 48 and is operable to direct water upwardly into tray 44 via water line 50. Float operated valve structure 52 within the water catch basin is connected to a suitable makeup water supply and maintains an adequate water level for operation of pump 46.

Refrigerant condensing structure broadly designated 54 is mounted within casing 12 between tray 44 and bottom wall 40 of the water catch basin, and includes a series of condenser units 56 connected in parallel supply and return relationship to the refrigeration equipment. Each of the condenser units 56 comprises an elongated conduit bent into serpentine configuration to present a series of generally parallel, normally horizontally disposed, vertically spaced segments 56a connected by circular upright end sections 56b. As is best evident from FIGS. 2 and 3, the condenser units 56 are located within casing 12 in disposition with imaginary planes therethrough in generally perpendicular relationship to the currents of air which are directed from the air inlet 32 to the air outlet 28. Also, as shown in FIG. 3, the condenser units 56 are located at an angle with respect to the vertical, with the upper extremities thereof being in closer relationship to fan housing 26, than the spacing of the lower extremities of the condenser units from front wall 20. Additionally, the upper extremity of every other condenser unit 56 is on opposite sides of casing 12 with alternate condenser tubes thereby being connected to the refrigerant supply lines 58 and 60 respectively. In this manner, the sections 56b of one-half of the condenser units 56 are located adjacent side wall 16, while the sections 56b of the remaining condenser units are positioned in proximal relationship to side wall 14. The lower extremities of the condenser units are also connected to alternate refrigerant liquid return lines 62 and 64, thereby causing all of the condenser tubes to be connected to the refrigeration system in parallel supply and return relationship.

It is also to be pointed out that the segments 56a of condenser units 56 are located in alignment horizontally of the casing 12 from front to rear thereof, with adjacent segments and sections thereby defining generally rectangular areas 68 therebetween as shown in FIG. 5, which face toward the front and rear of casing 12.

Means for interconnecting the condenser units to present a rigid framework, preferably comprises a pair of generally identical serpentine connector strips 66 of configuration as shown in FIGS. 5 and 6. These strips 66 are of a shape permitting mounting of a pair of the same on each aligned row of segments 56a of condenser units 56, and with proximal arcuate portions of the strips in engagement with the upper and lower surfaces of segments 56a of proximal condenser units 56 and thereby maintaining the same in predetermined, spaced, parallel relationship.

A fill assembly broadly designated 70 is removably positioned within each of the rectangular areas 68 and includes a series of horizontally and vertically spaced slats 72 which are located in horizontal disposition with the longitudinal axes thereof in perpendicular relationship to walls 14 and 16, and resting on a plurality of horizontal support members 74 in perpendicular relationship to slats 72. Each of the fill assemblies 70 preferably substantially fills corresponding rectangular areas 68 and therefore the outer opposed extremities of the fill assemblies are inclined at the same inclination as the front and rear major faces of condensing structure 54. A fill assembly 76 of the same construction as fill assembly 70 is provided over the uppermost segments 56a of condenser units 56, and another, somewhat larger fill assembly 78 of the same construction and configuration as fill assemblies 70 and 76, is located in underlying relationship to condensing structure 54 below return lines 62 and 64. The way in which the support members 74 of fill assembly 78 are located in vertically offset relationship along the line of inclination of the major faces of condensing structure 54, is clearly illustrated and shows the way in which fill assemblies 70 are also inclined as described.

A series of upright, inclined, horizontally spaced, parallel stringers 80 are provided between tray 44 and bottom wall 40 of casing 12 as shown in FIGS. 2 and 3, and located in close conforming disposition to the inclined front surface of condensing structure 54. The stringers 80, located in spaced relationship from side walls 14 and 16, serve to support a series of inclined inlet louvers 82 which serve the dual function of uniformly distributing air over the entire face of condensing structure 54 as well as fill assembly 78, and also prevent water from splashing out of the front portion of condensing structure 54 and fill assembly 78, as water gravitates downwardly therethrough. A pair of perforated plates 84 of generally rectangular configuration are secured to the outer margins of stringers 80 in substantially direct alignment with the air outlets 28 of fan enclosures 36 to prevent channeling of the air directed into casing 12, along the central portion of the condensing structure 54.

Spray eliminators 86 and 88 are mounted within casing 12 in proximal conforming relationship to the rear major face of condensing structure 54 as shown in FIG. 3, with the eliminators preferably taking the form of phenolic impregnated paper honeycomb having cells of from 1 to 2 inches in effective transverse diameter. The cells of eliminator 86 are preferably located in disposition with the longitudinal axes thereof at an angle of about 15° with respect to the horizontal, while the cells of eliminator 88 are disposed so that the longitudinal axes thereof are at an angle of approximately 45° with respect to the horizontal. In this manner, air passing through rectangular areas 68 of condensing structure 54, is directed outwardly and upwardly toward the air outlet 28 in the top of casing 12. Rapid exhaustion of air from casing 12 is assured by virtue of the V-shaped plenum chamber 90 within casing 12 defined by the rear wall 22 thereof, the proximal outer face of eliminator 88, and V-shaped portions of side walls 14 and 16.

In operation, the fans are actuated to direct air from inlet 32 through outlet 38 into the interior of casing 12 for flow through condensing structure 54. The perforated plates 84 force the air to be distributed across the entire vertical face of the inlet louver structure defined by louvers 82, whereby the air flows horizontally through the rectangular areas 68 and the lowermost fill assembly 78. Air is then ultimately discharged from the plenum chamber 90, vertically through the rectangular flange 30 surrounding air outlet 28.

Pump 46 is also placed in operation to direct water from the basin defined by bottom wall 40 and plates 42, upwardly into the distribution tray 44 via line 50. Water gravitates from tray 44 through the series of distribution ports therein, whereby the streams of water gravitate onto the upper slat 72 of fill assembly 76 and are broken into droplets and substantially smaller streams to effect cooling thereof by the air passing horizontally through fill assembly 76. The cool water than floods over the uppermost segments 56a of condenser units 56 to effect cooling of the refrigerant vapor which is directed into the upper extremities of the refrigerant conduits of condenser units 56 via parallel supply lines 58 and 60. As the water floods over the outer surface of the upper segments 56a of condenser units 56, the temperature of the water is raised by virtue of the thermal interchange and a portion of the refrigerant vapor commences to liquefy as the temperature thereof is lowered. In any event, even if a portion of the refrigerant vapor is not condensed in the uppermost segments 56a of the serpentine condenser units 56, the temperature of the vapor is substantially lowered so that condensation thereof can take place in the lower horizontal segments of the units 56.

After the water leaves the uppermost segments 56a, it gravitates onto the fill assembly 70 in the uppermost rectangular area 68, whereby water gravitating onto the slats 72 thereof, is again broken into droplets and relatively small streams which effects rapid cooling of the water by evaporation by virtue of the air driven through the uppermost fill assembly 70 from the fans within housing 26. The temperature of the water is thereby lowered to its initial temperature level or below, prior to flow of the coolant liquid onto the next row of condenser unit segments 56a located below the uppermost fill assembly 70. The temperature of the water is again raised as the refrigerant in the conduits is further lowered, and this cooling of the refrigerant as the temperature of the water is successively raised and then lowered, continues throughout the vertical height of condensing structure 54 until the water gravitates onto the lowermost fill assembly 78 for ultimate collection in the basin. It is pointed out that the number of slats 72 within each area 68 is chosen so that the water gravitating through condensing structure 54 is subjected to sufficient air and broken into droplets and small streams sufficient to cool the same to substantially the same temperature at which the water initially contacted a row of condenser unit segments 56a immediately thereabove. It can be appreciated that the number of slats 72 and the vertical height of each of the fill assemblies 70 may be computed for each evaporative cooler when factors such as the vapor temperature of the refrigerant, the probable maximum temperature of the ambient air, and the quantity of air drawn into casing 12 by the centrifugal fans, are properly correlated.

The variations in temperature of the recirculated water in apparatus 10, utilizing prior evaporative condensers wherein the water was passed over only one bank of coils, is illustrated in FIG. 8 wherein the air flow is represented from left to right and water flow from right to left. The water temperature, leaving the distribution tray and represented at the far right, drops slightly on passing through the area above the coil where the water is subjected to some evaporation, then rises sharply as it contacts the outer surfaces of the hot tubes, with decrease in temperature then taking place as the bottom of the coil is approached. A slight further decrease occurs while the water drops through other portions of the air stream between the bottom of the coil and the sump pan. It can be recognized that the temperature of the water very closely approaches the condensing temperature of the refrigerant vapor, thereby lowering the efficiency of the condensing operation inasmuch as maximum difference between condensing temperature and temperature of the water throughout the cooling operation is desirable in order to obtain maximum efficiency from the surface area of the cooling coil subjected to the water.

FIG. 7 represents a graphical indication of variations in the temperature of the recirculated water, utilizing apparatus 10, wherein it can be seen that the air flow is also from left to right while the water flow is from right to left. The water temperature, leaving distribution tray 44 and passing through the upper fill assembly 76, drops slightly but then begins to rise when contacting the uppermost segments 56a of condenser units 56. However, the water is not permitted to rise to a very high level because the water contacts only one horizontal row of the vapor conduits, before gravitating onto the uppermost fill assembly 70 to again be cooled by evaporation as the water is broken into droplets and very thin streams for gravitation onto the second horizontal row of conduit segments 56a. During gravitation through the uppermost fill assembly 70, the water is again returned to substantially the temperature thereof within distribution tray 44, or below. This pattern is continued until the water reaches the lower collection basin for return to the tray 44. Thus, the difference between the temperature of the water and the condensing temperature of the refrigerant is maintained at a maximum throughout passage of the water successively through fill assemblies 70 and thus, materially increased efficiency is obtained with much less tube surface area being required and also permitting reduction in the amount of actual refrigerant used for a particular installation.

Since the fill assemblies 70 may readily be removed from rectangular areas 68 by simply sliding them out of the condensing structure 54, cleaning of the condenser units 56 is rendered much easier than in prior units. However, scaling is also reduced to a very minimum with the present apparatus because of heavy flooding of the segments 56a of condenser units 56 with water and redistribution of such water by each of the fill assemblies to preclude only certain areas of the lowermost coils being subjected to the water as the latter tends to drift under the influence of currents of air passing through the casing. Furthermore, inclination of the entire condensing structure 54 as shown in FIG. 3, compensates for the tendency of the water to drift in the direction of air flow and assuring uniform flooding of all of the segments 56a with the coolant water. Furthermore, evaporation of the water to cool the same takes place only within the fill assemblies 70 thereby preventing evaporation of water spray from the surfaces of the coils which causes accumulation of mineral deposits thereon. Noteworthy also is the fact that the water is not raised to as high a temperature as with prior units, as is clearly evident in FIGS. 7 and 8, thereby further reducing the tendency of minerals being deposited on the condenser tubes during operation of the apparatus.

Apparatus 10 also provides more effective cooling because of a greater thermal head, the unit has reduced condenser tubing area over prior equipment of similar rated capacity, the components thereof may be readily cleaned when necessary although maintenance is not required as often as is the case with other units heretofore used, and the entire apparatus may be constructed in very compact size to permit installation thereof in areas where other types of cooling units are not suitable, particularly for indoor applications.

Having thus described the invention what is claimed as new and desired to be secured by Letters Patent is:

1. Evaporative cooling apparatus comprising: an outer casing provided with an air inlet and an air outlet disposed in horizontally spaced relationship; a plurality of individual, generally upright, horizontally spaced, side-by-side condenser units mounted within the casing between the air inlet and the air outlet, each of said condenser units including a conduit of generally serpentine configuration defining a series of elongated, horizontal, vertically superimposed segments interconnected by upright sections; structure operably coupled to the upper portions of said condenser units for supplying vapor thereto and to the lower extremities thereof for removing liquid from the same upon condensation of the vapor, said structure being connected to said condenser units in parallel supply and return relationship; coolant liquid means carried by said casing in overlying relationship to the uppermost of said segments of the condenser units for delivering coolant liquid onto said condenser units in successive contacting engagement with the outer surfaces of said segments thereof; basin means at the lower end of the casing for collecting the coolant liquid gravitating through the condenser units; mechanism on the casing for forcing air through the casing from the air inlet to the air outlet and in intersecting relationship to the coolant liquid gravitating through the casing from the coolant liquid means to the basin; and means between adjacent vertically spaced segments of the condenser units for engagement by the coolant liquid to increase the surface area thereof between said vertically spaced segments.

2. Evaporative cooling apparatus as set forth in claim 1 wherein said means includes a series of fill assemblies each having a plurality of vertically and horizontally spaced, generally horizontally disposed slats, said fill assemblies each including a sufficient number of slats and adjacent vertically spaced segments of the condenser units being positioned in sufficiently spaced relationship to increase the surface area of the coolant liquid to an extent to maintain the temperature thereof, during successive passage over the vertically spaced segments of the condenser units, at a temperature at the time of initial engagement of the coolant liquid with respective segments of the condenser units, at least approximately as low as the temperature of the coolant liquid first engaging the uppermost segments of the condenser units.

3. Evaporative cooling apparatus as set forth in claim 2 wherein each of said fill assemblies is positioned on and supported by the segments of the condenser units located immediately therebelow.

4. Evaporative cooling apparatus as set forth in claim 2 wherein said condenser units lie in parallel, generally upright planes located at an angle with respect to the vertical, extending transversely of the casing in substantially perpendicular relationship to the path of travel of air through the casing and positioned with the lower extremity of each condenser unit in farther spaced relationship to said air inlet than the upper extremities thereof.

5. Evaporative cooling apparatus as set forth in claim 4 wherein adjacent segments of all of the condenser units are aligned transversely of the casing and lie in respective generally parallel, horizontal imaginary planes, each of the fill assemblies being positioned on and supported by the segments of the condenser units located immediately therebelow.

6. Evaporative cooling apparatus as set forth in claim 2 wherein said sections of certain of the condenser units are located at one side of the casing while the sections of other of the condenser units are located at the opposite side of the casing whereby the segments and sections of all of the condenser units cooperate in combination to define vertically spaced, generally rectangular areas receiving respective fill assemblies.

7. Evaporative cooling apparatus as set forth in claim 6 wherein said sections of alternate condenser units are located at opposite sides of the casing.

8. Evaporative cooling appartus as set forth in claim 6 wherein is provided means engaging and interconnecting the sections of said condenser units located in common horizontal planes.

9. Evaporative cooling apparatus as set forth in claim 8 wherein each of said connector means comprises an elongated, longitudinally serpentine strip engaging the upper and lower surfaces respectively of adjacent horizontally aligned segments of the condenser units.

10. Evaporative cooling apparatus as set forth in claim 2 wherein said slats are disposed with the longitudinal axes thereof in generally perpendicular relationship to the path of travel of air from the air inlet to the air outlet.

11. Evaporative cooling apparatus as set forth in claim 1 wherein said coolant liquid delivery means is operable to deliver sufficient liquid onto the condenser units to prevent accumulation of substantial mineral deposits thereon caused by evaporation of liquid from the surfaces of the condenser units.

12. Evaporative cooling apparatus as set forth in claim 1 wherein is provided means for returning coolant liquid collected in the basin directly to said coolant liquid delivery means.

References Cited in the file of this patent
UNITED STATES PATENTS 2,076,119     Carraway _____ Apr. 6, 1937
3,012,416     Dart _____ Dec. 12, 1961